United States Patent Office 3,502,645
Patented Mar. 24, 1970

3,502,645
WATER-INSOLUBLE BENZOTHIAZOLE
MONOAZO DYES
Duncan G. Carmichael, Gastonia, N.C., assignor to Martin Marietta Corporation, a corporation of Maryland
No Drawing. Filed Feb. 16, 1968, Ser. No. 705,921
Int. Cl. C09b 29/08
U.S. Cl. 260—158                          5 Claims

ABSTRACT OF THE DISCLOSURE

Water-insoluble dyes of the formula

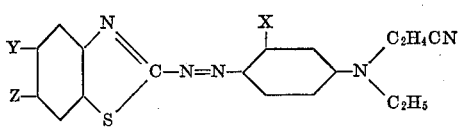

are prepared by coupling, under acid conditions, equimolar amounts diazotized

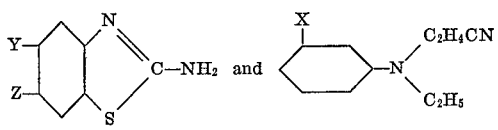

wherein X is H or CH$_3$, Y and Z are Cl or Br, and Y and Z are the same. The dyes may be used for coloring synthetic linear polyester, acetate rayon, polyacrylic and polypropylene textile fibers.

---

The present invention relates to water-insoluble azo dyes and to the method for making same.

The water-insoluble azo dyes of the present invention may be represented by the general formula

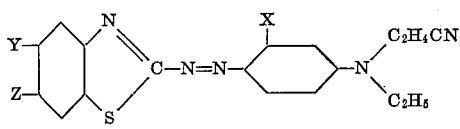

wherein X is CH$_3$ or H, Y and Z are Cl or Br, and further characterized in that Y and Z are the same.

The process of the present invention may be defined as follows. In the method for preparing water-insoluble azo dyes by coupling, under acid conditions, equimolar amounts of a diazotized amine and a coupling component of the formula

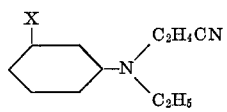

wherein X is CH$_3$ or H, the improvement characterized in that said diazotized amine is diazotized

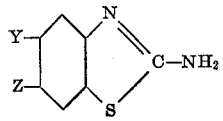

wherein Y and Z are Cl or Br, and Y and Z are the same. Dyes of Formula I above result from the defined process.

The dyes of the present invention are useful for making red-range dyeings on the following textile fibers. They are particularly suitable for dyeing acetate rayon by the known long bath method; are particularly suitable for dyeing synthetic linear polyester, such as polyethylene terephthalate, by the known carrier or thermofixation methods; and may also be used to dye nylon, polypropylene or polyacrylic textile fibers by the known long bath methods.

Generally speaking, dyeings prepared from the dyes of the present invention on synthetic linear polyester textile fibers or on acetate rayon textile fibers have very good to excellent fastness properties, as will be more fully shown below. Moreover, the dyes of the present invention have very good to excellent tinctorial power, and some have surprisingly outstanding brilliance of shade.

In preparing the dyes of the present invention, it is suggested that the coupling reaction for coupling the diazotized amine and coupling component be conducted at about 0°–20° C., and preferably at 0°–10° C. The coupling should also be conducted under acid conditions.

The following are illustrative examples of preparing the dyes of the present invention. All parts herein are by weight unless otherwise specified.

EXAMPLE 1

The water-insoluble azo dyestuff of the formula

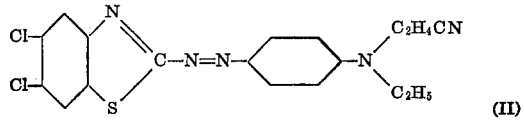
(II)

may be prepared as follows.

5,6-dichloro-2-aminobenzothiazole may be prepared by adding 600 ml. glacial acetic acid to 81 gms. 3,4-dichloroaniline, adding 81 gms. sodium thiocyanate thereto, heating to 40° C., holding at 40°–45° C. for 90 minutes, cooling to 10° C., adding dropwise 80 gms. bromine dissolved in 100 ml. glacial acetic acid during 1 hour while stirring at 10°–13° C., stirring 2 hours at 13°–15° C., collecting the precipitate by filtration, slurrying the precipitate in 2.4 liters water at 40°–50° C., adjusting to pH 9.5 by adding 230 gms. 25% aqueous NaOH gradually during 1 hour, cooling to 10° C., collecting the solids by filtration, washing the solids with 150 ml. H$_2$O at room temperature, and drying the resulting 5,6-dichloro-2-aminobenzothiazole at 70° C.

5,6-dichloro-2-aminobenzothiazole is diazotized as follows. Nitrosylsulfuric acid is prepared by adding 1.4 gms. NaNO$_2$ to 10 ml. 96% aqueous H$_2$SO$_4$, holding at 70°–75° C. for 10 minutes, and cooling to 5° C. Twenty ml. 1:5 acid (1 part propionic acid and 5 parts glacial acetic acid by volume) at 15° C. is added to the nitrosylsulfuric acid, the composition cooled to 5° C., and 4.1 gms.

5,6-dichloro-2-aminobenzothiazole is added thereto while maintaining the composition at 5°–10° C. Add 20 ml. 1:5 acid at 5°–10° C., stir 2.5 hours at 5°–10° C., add 0.5 gm. sulfamic acid, and maintain the resulting diazo solution at 5°–10° C.

3.3 gms. N-ethyl-N,β-cyanoethylaniline (Jour. Chem. Soc. 1956, pp. 388–395) is dissolved in 18 ml. 1:5 acid at room temperature and cooled to 5° C. The above solution of diazotized 5,6-dichloro-2-aminobenzothiazole is added thereto at 0°–5° C., the composition is stirred 2 hours at 0°–5° C., and stirred 1 hour more while allowing the temperature to rise to about room temperature. The composition is added to a mixture of 1 gm. sodium lignosulfonate in 200 ml. H₂O at room temperature and stirred 30 minutes at room temperature. The precipitated dye is collected by filtration, washed with water at tap temperature until free of acid, and dried at 40° C. The resulting dye is red.

EXAMPLE 2

The water-insoluble azo dye of the formula

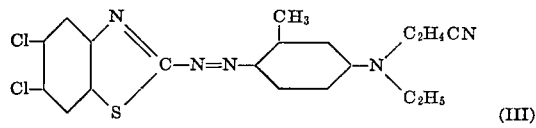

may be prepared as follows.

This example is the same as Example 1 above, except that 3.6 gms. N-ethyl-N,β-cyanoethyl-m-toluidine (Jour. Chem. Soc. 1956, pp. 388–395) is substituted for the N-ethyl-N,β-cyanoethylaniline used in Example 1, and except that the N-ethyl-N,β-cyanoethyl-m-toluidine is dissolved in 25 ml. of 1:5 acid instead of 18 ml. 1:5 acid. The resulting dye is red.

EXAMPLE 3

The water-insoluble azo dye of the formula

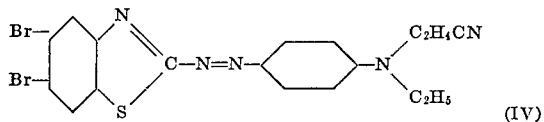

may be prepared as follows.

This example is the same as Example 1 above, except that 5.6 gms. 5,6-dibromo-2-aminobenzothiazole is substituted for the 4.1 gms. 5,6-dichloro-2-aminobenzothiazole used in Example 1.

The 5,6-dibromo-2-aminobenzothiazole is prepared in analogous manner to that used for making the 5,6-dichloro-2-aminobenzothiazole in Example 1, except that 125.5 gms. 3,4-dibromoaniline is substituted for the 81 gms. 3,4-dichloroaniline used in Example 1. The resulting dye is red.

EXAMPLE 4

The water-insoluble azo dye of the formula

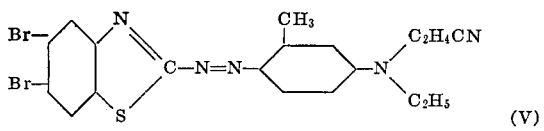

may be prepared as follows.

This example is the same as Example 3 above, except that 3.6 gms. N-ethyl-N,β-cyanoethyl-m-toluidine is substituted for the N-ethyl-N,β-cyanoethylaniline used in Example 3, and except that the N-ethyl-N,β-cyanoethyl-m-toluidine is dissolved in 25 ml. of 1:5 acid instead of 18 ml. 1:5 acid. The resulting dye is red.

The following relates to dispersing the dyes of the present invention, applying the same to synthetic linear polyester textile fibers or acetate rayon textile fibers, and to the properties of the dyeings.

Each of the dyes of the present invention may be dispersed by charging into a ball mill 17 parts of the selected dried dye, 10.2 parts sodium lingosulfonate, 10.2 parts glycerine and 54 parts water. The composition is ball milled until the dye particles are substantially uniform and average 1–2 microns. Enough water is added to bring the final volume to 100 parts, resulting in a 17% aqueous dispersion of the dye.

Each of the dispersed dyes may be used to dye acetate rayon textile fibers by the known long bath method. Each may be used also to dye synthetic linear polyester textile fibers, such as polyethylene terephthalate textile fibers, which may optionally be blended with cotton, by the known carrier or thermofixation dyeing methods.

In the following tests, pattern and stain are read on the Grey Scale in which 5 is optimum. Also, light fastness tests are conducted on the Fade-Ometer® carbon arc light fastness tester.

EXAMPLE A

A heavy shade dyeing was made on woven blended 65% polyethylene terephthalate/35% cotton textile fabric by mixing a padding liquor containing 113.6 gms. 17% aqueous dispersion of the dye of Example 1, 5.7 gms. sodium alginate migration inhibitor, and enough water to bring to 1 gallon; padding the fabric through the liquor at room temperature; squeezing the fabric with nip rollers to 60% wet pick up based on fabric weight; predrying to substantial dryness; fixing the dye by exposing the fabric to dry heat in a thermosol oven at 415° F. for 90 seconds; clearing the dyeing by immersing for 10 minutes at 160° F. in an aqueous bath containing 2 gm./liter 50% aqueous NaOH, 2 gm./liter sodium hydrosulfite, and 1 gm./liter soap; rinsing with water; immersing the dyeing for 1 minute at 140° F. in an aqueous bath containing 2% sodium bichromate and 2% glacial acetic acid; and scouring and dying the fabric. The resulting dyeing was scarlet on the polyethylene terephthalate and the cotton was reserved as white.

The resulting dyeing had very good wash fastness, with pattern 5 and stain 4 on No. 3 AATCC wash test; excellent gas fastness (oxides of nitrogen), with shade change 5 at 2 cycles; excellent fastness to ozone, with shade change 5 at 2 cycles; very good sublimation fastness, sublimation commencing at 366° F., and with stain 4 at 395° F.; and commercially acceptable light fastness, showing trace break at 20 hours.

The dyes of Examples 1 and 2 were applied to woven polyethylene terephthalate textile fabric by the conventional long bath carrier method, using emulsified o-phenylphenol carrier. The amounts of dye were varied so that dyeings of 2% and 4% strength were prepared from the Example 1 dye, and dyeings of 0.5% and 2% strength were prepared from the Example 2 dye. In this method, the liquor to goods ratio was 30:1, and percent relates to weight of 17% aqueous dye dispersion (calculated as dispersion) in the dye liquor to weight of fabric. The dyed fabric samples were subjected to tests, and the results are entered in Table 1 below.

The dyes of Examples 1 and 2 were applied to woven acetate rayon by the conventional long bath method, in which each dyebath contained the varying amount of dye below indicated, 2% monosodium phosphate, 2% sodium hexametaphosphate, 2% sodium N-methyl-N-oleoyl taurate, and the remainder water. The fabric was entered into the dyebath at 120° F., the temperature was raised gradually to 180° F. while agitating the fabric, the fabric was agitated in the bath for 1 hour at 180° F., rinsed with cold water and dried. The amounts of dye were varied so that dyeings of 2% and 4% strength were prepared from the Example 1 dye, and dyeings of 0.5% and 2% strength were prepared from the Example 2 dye. In this method, the liquor to goods ratio was 30:1, and percent relates to weight of 17% aqueous dye dispersion (calculated as dispersion) in the dye liquor to weight of fabric. The dyed fabric samples were subjected to tests, and the results are entered in Table 2 below.

TABLE 1.—POLYETHYLENE TEREPHTHALATE DYEINGS

| Test | Example 1 dye 2% dyeing | Example 1 dye 4% dyeing | Example 2 dye 0.5% dyeing | Example 2 dye 2% dyeing |
|---|---|---|---|---|
| Light fastness | Trace break at 20 hours | Trace break at 40 hours | Trace break at 20 hours | Trace break at 20 hours. |
| No. 3 AATCC wash fastness test. | Excellent; pattern 5, stain 4-5. | Very good; pattern 5, stain 4. | Excellent; pattern 5, stain 5. | Excellent; pattern 5, stain 4-6. |
| Sublimation 30 sec. at 400° F. | Very good; stain 4 | Good; stain 3-4 | Excellent; stain 5 | Very good; stain 4-5. |
| Shade | Brilliant scarlet | Brilliant scarlet | Bluish red | Bluish-red. |

TABLE 2.—ACETATE RAYON DYEING

| Test | Example 1 dye 2% dyeing | Example 1 dye 4% dyeing | Example 2 dye 0.5% dyeing | Example 2 dye 2% dyeing |
|---|---|---|---|---|
| Light fastness | Slight break at 40 hours | More than 40 hours without break. | Slight break at 40 hours | Slight break at 40 hours. |
| No. 2 AATCC wash fastness test. | Very good; pattern 5, stain 4. | Good; pattern 4-5, stain 3 | Excellent; pattern 5, stain 5. | Very good; pattern 5, stain 4. |
| Gas fastness (oxides of nitrogen). | Good; 3 cycles, shade change 4-5. | Good; 3 cycles, shade change 4-5. | Good; 2 cycles, shade change 4-5. | Good; 2 cycles, shade change 4-5. |
| Shade | Bright red | Bright red | Rubine | Rubine. |

What is claimed is:

1. Water-insoluble azo dyes of the formula

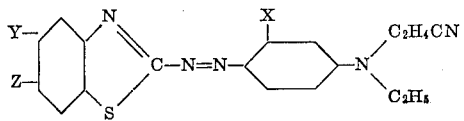

wherein X is H or $CH_3$, Y and Z are Cl or Br, and wherein Y and Z are the same.

2. A dye as defined in claim 1, wherein X is H and Y and Z are Cl.

3. A dye as defined in claim 1, wherein X is H and Y and Z are Br.

4. A dye as defined in claim 1, wherein X is $CH_3$ and Y and Z are Cl.

5. A dye as defined in claim 1, wherein X is $CH_3$ and Y and Z are Br.

References Cited

UNITED STATES PATENTS

| | | | |
|---|---|---|---|
| 2,889,315 | 6/1959 | Bossard et al. | 260—158 X |
| 3,132,132 | 5/1964 | Suzvki et al. | 260—158 |

CHARLES B. PARKER, Primary Examiner

D. M. PAPUGA, Assistant Examiner

U.S. Cl. X.R.

8—41, 55; 260—305

UNITED STATES PATENT OFFICE
CERTIFICATE OF CORRECTION

Patent No. 3,502,645                                           March 24, 1970

Duncan G. Carmichael

It is certified that error appears in the above identified patent and that said Letters Patent are hereby corrected as shown below:

Column 4, line 36, "dying" should read -- drying --. Column 6, TABLE 1, fifth column, line 3 thereof, "4-6" should read -- 4-5 --. Columns 5 and 6, in the heading to TABLE 2, "DYEING" should read -- DYEINGS --.

Signed and sealed this 22nd day of December 1970.

(SEAL)
Attest:

Edward M. Fletcher, Jr.                       WILLIAM E. SCHUYLER, JR.
Attesting Officer                                  Commissioner of Patents

REEXAMINATION CERTIFICATE (213th)
United States Patent [19]
Carmichael

[11] B1 3,502,645
[45] Certificate Issued   Jul. 3, 1984

[54] WATER-INSOLUBLE BENZOTHIAZOLE MONOAZO DYES

[75] Inventor: Duncan G. Carmichael, Gastonia, N.C.

[73] Assignee: Martin Marietta Corporation

Reexamination Request:
No. 90/000,078, Sep. 30, 1981

Reexamination Certificate for:
Patent No.: 3,502,645
Issued: Mar. 24, 1970
Appl. No.: 705,921
Filed: Feb. 16, 1968

Certificate of Correction issued Dec. 22, 1970.

[51] Int. Cl.³ .................... C07D 277/82; C09B 29/08
[52] U.S. Cl. ...................................... 260/158; 8/532; 8/691; 548/164
[58] Field of Search ........................................ 260/158

[56] References Cited

U.S. PATENT DOCUMENTS

| | | |
|---|---|---|
| 2,149,051 | 2/1939 | Helberger et al. |
| 2,345,010 | 3/1944 | Seymour et al. |
| 2,373,700 | 4/1945 | McNally et al. |
| 2,441,612 | 5/1948 | Argyle et al. |
| 2,659,719 | 11/1953 | Dickey et al. |
| 2,771,466 | 11/1956 | Towne et al. |
| 2,785,157 | 3/1957 | Straley et al. |
| 2,832,764 | 4/1958 | Huenig |
| 2,833,689 | 5/1958 | Gerjovich |
| 2,851,391 | 9/1958 | Gerjovich et al. |
| 2,857,371 | 10/1958 | Straley et al. |
| 2,868,774 | 1/1959 | Straley et al. |
| 2,868,775 | 1/1959 | Straley et al. |
| 2,899,438 | 8/1959 | Jenny |
| 2,976,292 | 3/1961 | Tung et al. |
| 2,980,666 | 4/1961 | Merian et al. |
| 3,057,848 | 10/1962 | Dehn et al. |
| 3,084,153 | 4/1963 | Fishwick et al. |
| 3,090,789 | 5/1963 | Dehn et al. |
| 3,096,320 | 7/1963 | Lange et al. |
| 3,097,196 | 7/1963 | Straley et al. |
| 3,097,198 | 7/1963 | Fishwick et al. |
| 3,099,653 | 7/1963 | Straley et al. |
| 3,105,829 | 10/1963 | Merian et al. |
| 3,143,540 | 8/1964 | Meen et al. |
| 3,153,031 | 10/1964 | Alicot nee Calvo et al. |
| 3,169,954 | 2/1965 | Straley et al. |
| 3,221,006 | 11/1965 | Moore et al. |
| 3,245,980 | 4/1966 | Stright ................. 260/158 |
| 3,280,101 | 10/1966 | Straley et al. |
| 3,329,669 | 7/1967 | Sartori |
| 3,346,552 | 10/1967 | Straley et al. ......... 260/158 |
| 3,390,145 | 6/1968 | Wippel |
| 3,414,559 | 12/1968 | Sartori |
| 3,442,886 | 5/1969 | Dickey et al. ......... 260/158 |
| 3,467,644 | 9/1969 | Wolfrum et al. ...... 260/158 |

FOREIGN PATENT DOCUMENTS

| | | |
|---|---|---|
| 667856 | 1/1965 | Belgium |
| 639727 | 12/1936 | Fed. Rep. of Germany ...... 260/158 |
| 1065542 | 9/1959 | Fed. Rep. of Germany |
| 1092583 | 11/1960 | Fed. Rep. of Germany |
| 1113772 | 9/1961 | Fed. Rep. of Germany |
| 1135593 | 8/1962 | Fed. Rep. of Germany |
| 1135594 | 8/1962 | Fed. Rep. of Germany |
| 2256179 | 5/1973 | Fed. Rep. of Germany ...... 260/158 |
| 1907606 | 9/1974 | Fed. Rep. of Germany |
| 1216323 | 11/1959 | France |
| 1368033 | 6/1964 | France |
| 1381433 | 11/1964 | France |
| 1387513 | 12/1964 | France |
| 1496352 | 8/1967 | France |
| 42-21023 | 10/1967 | Japan |
| 44-30628 | 12/1969 | Japan ................. 260/158 |
| 44-32031 | 12/1969 | Japan ................. 260/158 |
| 45-7712 | 3/1970 | Japan ................. 260/158 |
| 45-8750 | 3/1970 | Japan ................. 260/158 |
| 161193 | 1/1980 | Netherlands ........ 260/158 |
| 787369 | 12/1957 | United Kingdom |
| 873602 | 7/1961 | United Kingdom |
| 896232 | 5/1962 | United Kingdom |
| 908656 | 10/1962 | United Kingdom |
| 919424 | 2/1963 | United Kingdom |
| 944250 | 12/1963 | United Kingdom |
| 1356695 | 6/1974 | United Kingdom ... 260/158 |

OTHER PUBLICATIONS

Organic Reactions, vol. III, pp. 244, 256 (Jan. 1947).
Straley, *The Chemistry of Synthetic Dyes*, Venkataraman, Ed., Academic Press: New York, 1970, pp. 385-462.
Sunthankar, *Recent Progress in the Chemistry of Natural and Synthetic Colouring Matters and Related Fields*, Gore et al, Ed., Academic Press: New York, 1962, pp. 517-536.
Straley, *Canadian Textile Journal*, May 1, 1959, reprint pp. 1-13.
Muller, *American Dyestuff Reporter*, Mar. 1970, pp. 37-44.
Sartori, *The Journal of the Society of Dyers and Colourists*, vol. 72, No. 11, 1956, pp. 513-527.
Sartori, *The Journal of the Society of Dyers and Colourists*, May, 1967, pp. 144-146.

Primary Examiner—Charles E. Warren

[57] ABSTRACT

Water-insoluble dyes of the formula

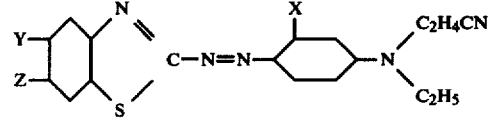

are prepared by coupling, under acid conditions, equimolar amounts diazotized

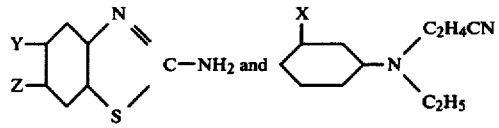

wherein X is H or $CH_3$, Y and Z are Cl or Br, and Y and Z are the same. The dyes may be used for coloring synthetic linear polyester, acetate rayon, polyacrylic and polypropylene textile fibers.

REEXAMINATION CERTIFICATE ISSUED UNDER 35 U.S.C. 307.

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 and 3–5 is confirmed.

Claim 2, having been finally determined to be unpatentable, is cancelled.

New claim 6 is added and determined to be patentable.

6. *The water-insoluble azo dyestuff of the formula*

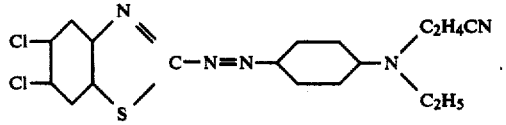

* * * * *